United States Patent
Kwon et al.

(10) Patent No.: US 10,254,573 B2
(45) Date of Patent: Apr. 9, 2019

(54) FLEXIBLE DISPLAY DEVICE AND METHOD FOR MANUFACTURING THEREOF

(71) Applicant: LG DISPLAY CO., LTD., Seoul (KR)

(72) Inventors: Hoiyong Kwon, Busan (KR); MiReum Lee, Gimhae-si (KR)

(73) Assignee: LG DISPLAY CO., LTD., Seoul (KR)

( * ) Notice: Subject to any disclaimer, the term of this patent is extended or adjusted under 35 U.S.C. 154(b) by 122 days.

(21) Appl. No.: 14/984,736

(22) Filed: Dec. 30, 2015

(65) Prior Publication Data

US 2016/0323994 A1 Nov. 3, 2016

(30) Foreign Application Priority Data

Apr. 30, 2015 (KR) .................. 10-2015-0062026

(51) Int. Cl.
*G02F 1/1333* (2006.01)

(52) U.S. Cl.
CPC .. *G02F 1/133305* (2013.01); *G02F 1/133308* (2013.01)

(58) Field of Classification Search
CPC .............. G02F 1/113; G02F 1/133305; G02F 1/13452; H01L 51/52
See application file for complete search history.

(56) References Cited

U.S. PATENT DOCUMENTS

| 7,808,599 | B2 * | 10/2010 | Nakanishi | ........... G02F 1/13452 174/254 |
|---|---|---|---|---|
| 2006/0288571 | A1 | 12/2006 | Seo et al. | |
| 2010/0277448 | A1 * | 11/2010 | Okamoto | .......... G02F 1/133305 345/206 |
| 2011/0114954 | A1 * | 5/2011 | Lee | ....................... H01L 51/5246 257/59 |
| 2013/0342429 | A1 * | 12/2013 | Choi | ....................... H05K 13/00 345/30 |
| 2014/0159046 | A1 * | 6/2014 | Deng | .................. H01L 27/1218 257/72 |
| 2014/0183473 | A1 * | 7/2014 | Lee | ...................... H01L 51/0097 257/40 |
| 2015/0009613 | A1 * | 1/2015 | Morita | ................... G06F 1/1652 361/679.26 |
| 2015/0028307 | A1 * | 1/2015 | Kim | ......................... H01L 51/56 257/40 |
| 2015/0220118 | A1 * | 8/2015 | Kwak | ........................ G06F 3/14 345/667 |
| 2016/0254329 | A1 * | 9/2016 | Hsieh | .................. H01L 27/3244 257/72 |
| 2016/0323993 | A1 * | 11/2016 | Kwon | ................ G02F 1/133305 |

FOREIGN PATENT DOCUMENTS

| CN | 1885111 A | 12/2006 |
|---|---|---|
| CN | 102969320 A | 3/2013 |
| CN | 104167429 A * | 11/2014 ......... H01L 27/3244 |

* cited by examiner

*Primary Examiner* — Nathan Milakovich
(74) *Attorney, Agent, or Firm* — Birch, Stewart, Kolasch & Birch, LLP

(57) ABSTRACT

Disclosed is a flexible display device that may include a flexible substrate; a display device layer provided on a first surface of the flexible substrate; and a deformation-preventing portion provided on a second surface of the flexible substrate, the second surface corresponding to the opposite surface to the first surface provided with the display device layer, wherein the display device layer includes a first area and a second area, and the deformation-preventing portion is overlapped with the second area.

20 Claims, 7 Drawing Sheets

FLEXIBLE DISPLAY DEVICE AND METHOD FOR MANUFACTURING THEREOF

CROSS REFERENCE TO RELATED APPLICATION

This application claims the benefit of the Korean Patent Application No. 10-2015-0062026 filed on Apr. 30, 2015, which is hereby incorporated by reference as if fully set forth herein.

BACKGROUND OF THE INVENTION

Field of the Invention

Embodiments of the present invention relate to a display device and a method for manufacturing thereof, and more particularly, to a flexible display device and a method for manufacturing thereof.

Discussion of the Related Art

A flexible display device is realized by forming a pixel cell on a thin flexible substrate such as plastic. Thus, even though the flexible display device is rolled or wound while being paper-like, an image may be displayed thereon. Owing to these advantages, the flexible display device has been steadily studied and developed as a next-generation display device.

The flexible display device may include a flexible liquid crystal display device, a flexible plasma display device, a flexible organic light emitting display device, a flexible electrophoretic display device, a flexible electro-wetting display device, etc.

Among the above flexible display devices, the organic light emitting display device has especially attracted great attentions as a next-generation display device owing to advantages of rapid response time of 1 ms or less, low power consumption and self light emission.

Hereinafter, a related art flexible display device will be described with reference to the accompanying drawings.

Figure 1A:
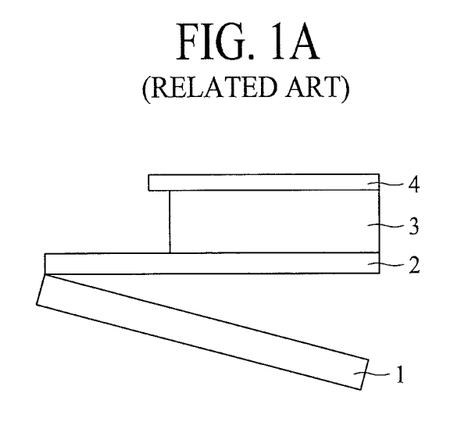
FIGS. 1A and 1B are cross sectional views illustrating a related art flexible display device.
Figure 1B:
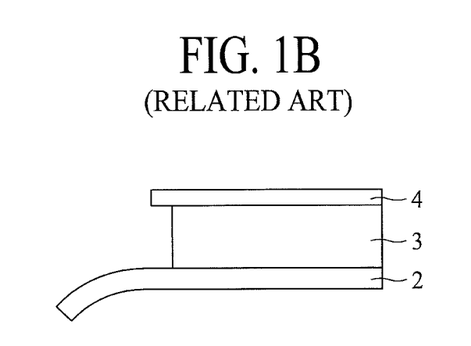

FIGS. 1A and 1B are cross sectional views illustrating a related art flexible display device.

Referring to FIGS. 1A and 1B, the related art flexible display device may include a base substrate 1, a flexible substrate 2, a display device layer 3, and an encapsulation layer 4.

The flexible substrate 2 is a thin substrate of plastic. The flexible substrate 2 is too thin to bear a process of depositing the display device layer 3 and the encapsulation layer 4 of a manufacturing process. For this reason, the base substrate 1, which is formed of a solid material capable of supporting the flexible substrate 2, is attached to one surface of the flexible substrate 2, and then the display device layer 3 and the encapsulation layer 4 are formed on the other surface of the flexible substrate 2 during the manufacturing process.

Then, as shown in the flexible display device of FIG. 1B, the base substrate 1 is removed from the flexible display device. For a process of removing the base substrate 1 from the related art flexible display device, a force of supporting the flexible substrate 2 disappears so that the flexible substrate 2 might be rolled in any one direction.

Accordingly, the flexible substrate 2 may be entirely wrinkled, and other elements to be attached to the flexible substrate 2 may be unstably provided and thus separated from the flexible substrate 2.

SUMMARY OF THE INVENTION

Accordingly, embodiments of the present invention are directed to a flexible display device that substantially obviates one or more problems due to limitations and disadvantages of the related art.

An aspect of embodiments of the present invention is to provide a flexible display device which is capable of preventing a flexible substrate from being deformed when a base substrate is removed therefrom.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a flexible display device that may include a flexible substrate; a display device layer provided on a first surface of the flexible substrate; and a deformation-preventing portion provided on a second surface of the flexible substrate, the second surface corresponding to the opposite surface to the first surface provided with the display device layer, wherein the display device layer includes a first area and a second area, and the deformation-preventing portion is overlapped with the second area.

In another aspect of embodiments of the present invention, there is provided a method of manufacturing a flexible display device that may include forming a flexible substrate on a base substrate; forming a display device layer including a first area and a second area on a first surface of the flexible substrate; and forming a deformation-preventing portion on a second surface of the flexible substrate, wherein the deformation-preventing portion is overlapped with the second area.

In another aspect of embodiments of the present invention, there is provided a flexible display device that may include a flexible substrate having a first surface and a second surface; a display device layer provided on the first surface of the flexible substrate; and a deformation-preventing portion provided on a portion of the second surface of the flexible substrate, wherein the deformation-prevention portion braces the portion of the second surface of the flexible substrate from being deformed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In an instance where 'comprise', 'have', and 'include' described in the present specification are used, another part may be added unless 'only~' is used. The terms of a singular form may include plural forms unless referred to the contrary. In construing an element, the element is construed as including an error region or margin or error although there is no explicit description thereof.

In descriptions of embodiments of the present invention, when a structure (for example, an electrode, a line, a wiring, a layer, or a contact) is described as being formed at an upper portion/lower portion of another structure or on/under the other structure, this description should be construed as including an instance where the structures contact each other and moreover, an instance where a third structure is disposed therebetween.

In describing a time relationship, for example, when the temporal order is described as 'after~', 'subsequent~', 'next~', and 'before~', an instance which is not continuous may be included unless 'just' or 'direct' is used.

It will be understood that, although the terms "first", "second", etc., may be used herein to describe various elements, these elements should not be limited by these terms. These terms are used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in a co-dependent relationship.

Hereinafter, a flexible display device according to embodiments of the present invention will be described with reference to the accompanying drawings.

Figure 2:
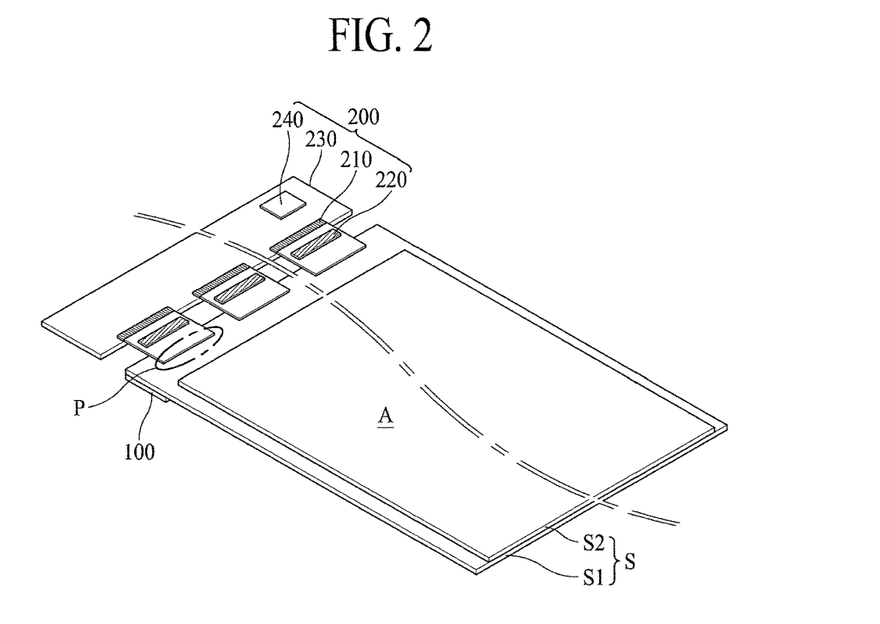
FIG. 2 is a perspective view illustrating a flexible display device according to one embodiment of the present invention.
Figure 3:
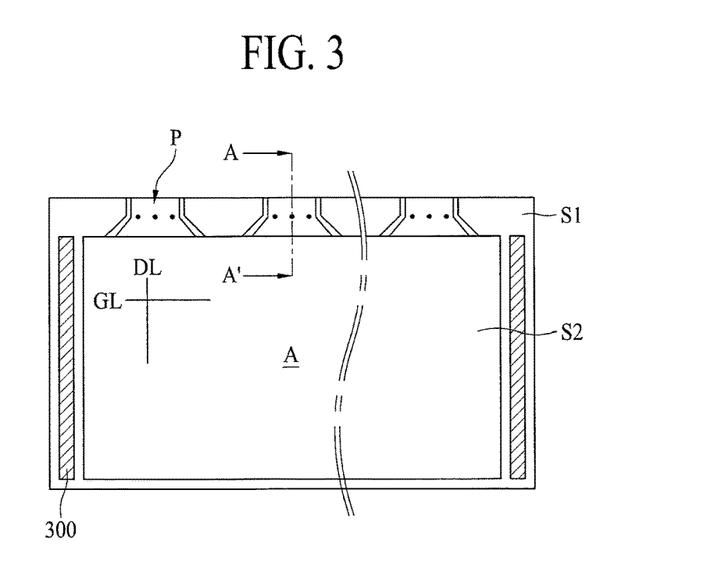
FIG. 3 is a plane view illustrating the flexible display device according to one embodiment of the present invention.

FIG. 2 is a perspective view illustrating a flexible display device according to one embodiment of the present invention. FIG. 3 is a plane view illustrating the flexible display device according to one embodiment of the present invention.

As shown in FIGS. 2 and 3, the flexible display device according to one embodiment of the present invention may include a lower substrate S1, an upper substrate S2, a pad portion P, a deformation-preventing portion 100, a panel driver 200, and a gate driving circuit 300.

The lower substrate S1 may include a display area A, and a non-display area provided in the periphery of the display area A. The display area A corresponds to an area except the edge of the lower substrate S1, wherein an image is displayed on the display area A. The display area A may include a plurality of pixels provided every pixel regions defined by crossing a plurality of gate lines GL and a plurality of data lines DL. In this instance, the display area A may correspond to a first area to be explained later, and the non-display area may correspond to a second area.

The upper substrate S2 confronting or facing the display area A is bonded to the display area A.

The plurality of pad portions P are provided at fixed intervals on the non-display area of the lower substrate S1, wherein each pad portion P includes a pad which is electrically connected with the plurality of data lines. Also, the pad portion P provided in the non-display area may overlap with the second area to be explained later.

The deformation-preventing portion 100 is provided on a lower surface of the non-display area of the lower substrate S1, wherein the deformation-preventing portion 100 is formed in a structure parallel to a side of the lower substrate S1. The lower substrate S1 may include a flexible substrate, wherein the flexible substrate is a thin substrate of plastic. The flexible substrate is too thin to bear a deposition process for a manufacturing process. Accordingly, after a base substrate, which is formed of a solid material capable of supporting the flexible substrate for the manufacturing process, for example, glass is attached to one surface of the flexible substrate, a display device layer is formed on the other surface of the flexible substrate, and the upper substrate S2 is formed on the display device layer.

In the instance of the related art flexible display device, the base substrate is completely removed after a process of forming the upper substrate S2. For a process of removing the base substrate from the related art flexible display device, a force of supporting the flexible substrate disappears so that the flexible substrate might be rolled in any one direction, and the lower substrate S1 might be deformed. Especially, the non-display area of the lower substrate S1 is relatively thin so that the non-display area of the lower substrate S1 might be rolled in any one direction. According as the non-display area of the lower substrate S1 is rolled in any one direction, the display area of the lower substrate S1 may be also wrinkled entirely, and thus, deformed.

Unlike the related art in which the base substrate provided on one surface of the flexible substrate is completely removed, the flexible display device according to one embodiment of the present invention discloses that some of the base substrate is left as the deformation-preventing portion 100 and the remaining base substrate is removed. That is, in an instance of one surface of the lower substrate S1 on which the upper substrate S2 is not formed, the display area A of one surface of the lower substrate S1 is exposed, and one surface of the deformation-preventing portion 100 provided on the non-display area of one surface of the lower substrate S1 is exposed.

The deformation-preventing portion 100, which is formed of a relatively solid material, is provided on the non-display area of one surface of the lower substrate Si so that it is possible to support the relatively-thin flexible substrate, and also to prevent the lower substrate S1 of the non-display area from being rolled in any one direction.

FIG. 2 shows that the deformation-preventing portion 100 is formed on only a lower surface of the pad portion P, but is not limited to this structure. For example, the deformation-preventing portion 100 may be formed on the lower surface of the non-display area of the lower substrate S1 provided with a lower surface of the gate driving circuit 300. If the flexible display device according to the present invention is applied to a rollable display device, the deformation-preventing portion 100 may be provided in any one side of the non-display area of the lower substrate S1.

The deformation-preventing portion 100 may be formed of a base substrate of glass, but is not limited to this material. For example, the deformation-preventing portion 100 may be formed of a base substrate of plastic or metal.

The panel driver 200 may include a film package 210, a data driving chip 220, a printed circuit board 230, and a driving power generator 240.

The film package 210 is attached to each of the pad portions P provided on the lower substrate S1 while being connected with the data line DL. The film package 210 may be formed of Chip On Flexible Board or Chip On Film (COF) or Tape Carrier Package (TCP) with a plurality of input/output pads (I/O pads).

The data driving chip 220 is provided in each film package 210. The data driving chip 220 converts video data supplied from the input pad of the film package 210 into a data signal of an analog type, and supplies the data signal to the corresponding data line via the output pad of the film package 210.

The printed circuit board 230 is attached to the input pad of each of the plurality of film packages 210. The printed circuit board 230 supplies video data to the data driving chip 220, and also supplies driving power (for example, driving voltage, gamma voltage, ground power, and etc.) and control signal for displaying an image to the flexible substrate 15. To this end, on the printed circuit board 230, there are a timing controller for generating the video data and control signal, and a driving power generator 240 for generating the driving power.

The gate driving circuit 300 is provided in the non-display area, and is disposed close to any one side of the display area A, wherein the gate driving circuit 300 drives the gate line GL. The gate driving circuit 300 may include a gate control signal line group supplied with a plurality of gate control signals from the panel driver 200, and a plurality of stages for generating a gate signal in accordance with the plurality of gate control signals and sequentially supplying the gate signal to the gate lines GL. In this instance, the plurality of gate control signals may be a gate start pulse, a plurality of gate clock signals, and etc. The gate driving circuit 300 generates the gate signal in accordance with a sequential driving of the stages, and sequentially supplies the gate signal to the plurality of gate lines GL.

Figure 4:
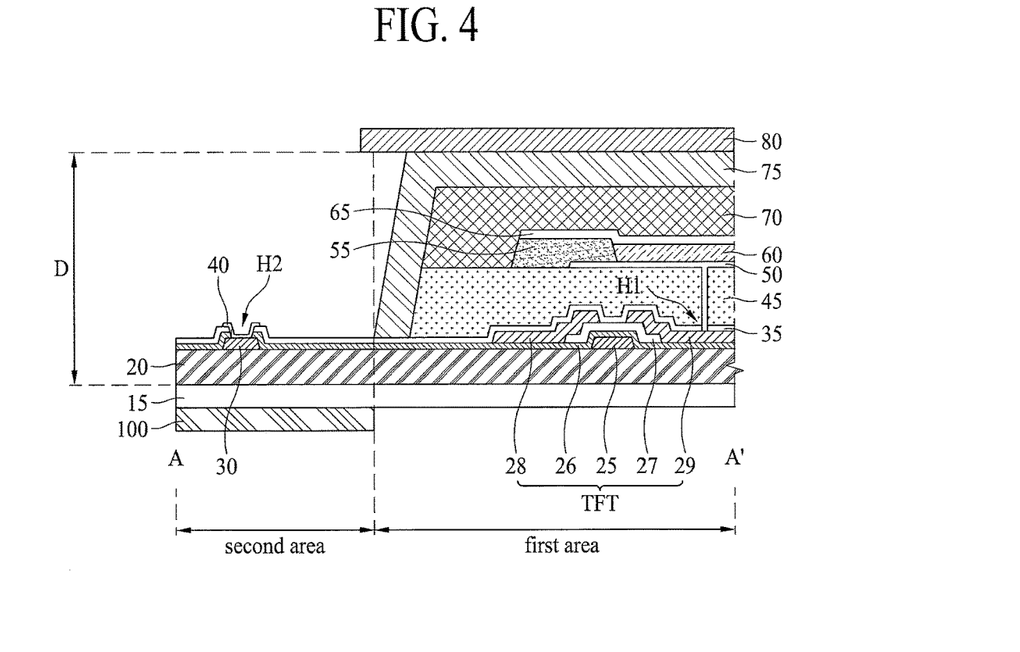
FIG. 4 is a cross sectional view illustrating a flexible display device according to another embodiment of the present invention.

FIG. 4 is a cross sectional view illustrating a flexible display device according to another embodiment of the present invention, which corresponds to a cross section along A-A' of FIG. 3.

As shown in FIG. 4, the flexible display device according to another embodiment of the present invention may include a flexible substrate 15, a display device layer D provided on one surface of the flexible substrate 15, an encapsulation layer 80 provided on the display device layer D, and a deformation-preventing portion 100 provided on the other surface of the flexible substrate 15, that is, the opposite surface to one surface provided with the display device layer D.

The flexible substrate 15 may be formed of a thin substrate of plastic. For example, the flexible substrate may include any one among polyethersulphone (PES), polyacrylate, (PAR), polyetherimide (PEI), polyethyelenen naphtalate (PEN), polyethyelene terepthalte (PET), polyphenylene sulfide (PPS), polyallylate, polyimide, polycarbonate (PC), cellulose triacetate (TAC) and cellulose acetate propionate (CAP). If applying heat to the flexible substrate 15, the flexible substrate may shrink. Thus, for a manufacturing process, a base substrate of glass is attached fixedly to the other surface of the flexible substrate 15, that is, the opposite surface to one surface provided with the display device layer D. After completing the manufacturing process, the base substrate is removed from the flexible display device.

The display device layer D may include a first area with a relatively low level of a thermal deformation, and a second area with a relatively high level of a thermal deformation. Accordingly, the first area has a thermal deformation that is less than a thermal deformation of a second area.

The first area may include a buffer layer 20, a thin film transistor TFT, a passivation layer 35, a first planarization layer 45, a first electrode 50, a bank layer 55, an organic light emitting layer 60, a second electrode 65, a second planarization layer 70, and an adhesive layer 75.

The buffer layer 20 is provided on the flexible substrate 15. The buffer layer 20 may be formed of one or more layers. If applying heat to the buffer layer 20, the buffer layer 20 may be released.

The thin film transistor TFT is provided on the buffer layer 20. The thin film transistor TFT may include a gate electrode 25, a gate insulating layer 26, an active layer 27, a source electrode 28, and a drain electrode 29.

The gate electrode 25 is provided on the buffer layer 20. The gate insulating layer 26 is interposed between the gate electrode 25 and the active layer 27, and the gate electrode 25 is overlapped with the active layer 27. The gate electrode 25 may be formed in a single-layered structure or multi-layered structure using any one of molybdenum (Mo), aluminum (Al), chrome (Cr), aurum or gold (Au), titanium (Ti), nickel (Ni), neodymium (Nd) and copper (Cu), or their alloys.

The gate insulating layer 26 is provided on the gate electrode 25. The gate electrode 25 and the active layer 27 are insulated from each other by the gate insulating layer 26. The gate insulating layer 26 may be formed of an inorganic insulating material such as silicon oxide or silicon nitride, but is not limited to these materials. The gate insulating layer 26 may be formed of an organic insulating material such as photoacryl or benzocyclobutene (BCB). If applying heat to the gate insulating layer 26, the gate insulating layer 26 may be released.

The active layer 27 is overlapped with the gate electrode 25, and provided on the gate insulating layer 26. The active layer 27 may be formed of a silicon-based semiconductor, or may be formed of an oxide semiconductor such as In—Ga—Zn—O (IGZO).

The source electrode 28 and the drain electrode 29 confronting each other are provided on the active layer 27, wherein the source electrode 28 is connected with one side of the active layer 27, and the drain electrode 29 is connected with the other side of the active layer 27. Each of the source electrode 28 and the drain electrode 29 may be formed in a single-layered structure or multi-layered structure using any one of molybdenum (Mo), aluminum (Al), chrome (Cr), aurum or gold (Au), titanium (Ti), nickel (Ni), neodymium (Nd) and copper (Cu), or their alloys.

The aforementioned thin film transistor TFT relates to a bottom gate structure in which the gate electrode 25 is provided below the active layer 27. The present invention may include a top gate structure in which the gate electrode 25 is provided above the active layer 27.

The passivation layer 35 is provided on the thin film transistor TFT, thereby protecting the thin film transistor TFT. The passivation layer 35 may be formed of an inorganic insulating material, for example, silicon oxide ($SiO_x$) or silicon nitride ($SiN_x$). If applying heat to the passivation layer 35, the passivation layer 35 may be released.

The first planarization layer 45 is provided on the passivation layer 35, thereby planarizing an upper surface of the passivation layer 35. For example, the first planarization layer 45 may be formed of acryl resin, epoxy resin, phenolic resin, polyamide resin, polyimide resin, and etc. If applying heat to the first planarization layer 45, the first planarization layer 45 may shrink.

The aforementioned passivation layer 35 and first planarization layer 45 are provided with a first contact hole H1 for exposing the drain electrode 29. Through the first contact hole H1, the drain electrode 29 and the first electrode 50 are connected with each other.

The first electrode 50 is provided on the first planarization layer 45. The first electrode 50 is connected with the drain electrode 29 which is exposed through the first contact hole H1. The first electrode 50 may function as an anode electrode of the thin film transistor TFT.

The bank layer 55 is provided on the first electrode 50. The bank layer 55 may be formed of an organic film of polyimide resin, acryl resin, benzocyclobutene (BCB), and etc. If applying heat to the bank layer 55, the bank layer 55 may shrink.

The organic light emitting layer 60 is provided on the first electrode 50. The organic light emitting layer 60 may be formed in a combination structure of hole injection layer, hole transport layer, organic emission layer, electron transport layer, and electron injection layer, but is not limited to this structure. A structure of the organic light emitting layer 60 may be changed to various structures generally known to those in the art.

The second electrode 65 is provided on the organic light emitting layer 60. If the first electrode 50 functions as the anode electrode, the second electrode 65 functions as a cathode electrode.

The second planarization layer 70 is provided on the first planarization layer 45 and the second electrode 65, thereby planarizing an upper surface of the second electrode 65, and protecting the thin film transistor TFT and the organic light emitting layer 60 from external moisture. If applying heat to the second planarization layer 70, the second planarization layer 70 may shrink.

The adhesive layer 75 is provided on the second planarization layer 70. The second planarization layer 70 and the encapsulation layer 80 are adhered to each other by the adhesive layer 75.

Among the above elements of the first area, the buffer layer 20, the gate insulating layer 26 and the passivation layer 35 include an inorganic insulating material. Generally, if applying heat to the inorganic insulating material, the inorganic insulating material may be released. Among the above elements of the first area, the first and second planarization layers 45 and 70 and the bank layer 55 include an organic insulating material. If applying heat to the organic insulating material, the organic insulating material may shrink. Accordingly, the first area is provided with both the layer which is released by heat and the layer which shrinks by heat. At this time, the buffer layer 20 may be provided with one or more layers. Thus, if applying heat to the buffer layer 20, the elements which shrink by heat and the elements which are released by heat are complementarily mixed together at similar percentages so that it is possible to prevent the flexible substrate 15 from being deformed without the base substrate.

The second area may include a buffer layer 20, a pad 30, a gate insulating layer 28, a passivation layer 35, and a pad electrode 40.

The buffer layer 20 is provided on the flexible substrate 15, and the pad 30 is provided on the buffer layer 20. The pad electrode 40 is connected with the pad 30 via a second contact hole H2.

The buffer layer 20, the gate insulating layer 27 and the passivation layer 35 extend from the first area. Thus, the same reference numbers will be used throughout the drawings to refer to the same or like parts, and a detailed description for the same parts will be omitted.

Among the above elements of the second area, the buffer layer 20, the gate insulating layer 26 and the passivation layer 35 are released by heat. However, there are no elements which shrink by heat in the second area. Thus, the second area is provided only with the elements having the constant deformation so that it is impossible to realize complementariness. In this instance, if the base substrate is removed from the second area, the flexible substrate 15 of the second area may be deformed.

Meanwhile, in the flexible display device according to another embodiment of the present invention, the second area is not provided with the elements which shrink by heat, but such is not necessarily required. Even though the second area is provided with the elements which shrink by heat, a percentage of the elements which shrink by heat may be relatively lower than a percentage of the elements which are released by heat, which might cause the deformation of the flexible substrate 15. That is, if the second area is mainly provided with any one kind of the elements which shrink by heat and the elements which are released by heat, the flexible substrate 15 might be deformed.

In order to overcome the problem relating to the deformation of the flexible substrate 15, the flexible display device according to another embodiment of the present invention is provided with the deformation-preventing portion 100 which overlaps with the second area. The deformation-preventing portion 100 is provided on one surface of the flexible substrate 15 overlapped with the second area, whereby the flexible substrate 15 corresponding to the second area is supported or braced by the deformation-preventing portion 100, thereby preventing the deformation of the flexible substrate 15. The deformation-preventing portion 100 is formed of a relatively solid material, for example, glass, so that it is possible to prevent the flexible substrate 15 from being bent, that is, the deformation of the flexible substrate 15. Also, the deformation-preventing portion 100 may be formed of a structure being in parallel to the side of the flexible substrate 15. The flexible substrate 15 is exposed in the first area, however, one surface of the deformation-preventing portion 100 is exposed in the second area.

The encapsulation layer 80 is provided on the adhesive layer 75. The encapsulation layer 80 prevents permeation of the external moisture, to thereby prevent degradation of the organic light emitting layer 60. The encapsulation layer 80 may be formed of metal such as copper (Cu) and aluminum (Al), or their alloys. Especially, the encapsulation layer 80 is provided on an entire upper surface of the first area of the display device layer D, to thereby support the flexible substrate 15 without using the base substrate. According to the flexible substrate 15 of the first area being supported by the encapsulation layer 80, it is possible to prevent the flexible substrate 15 from being rolled in some degree.

Accordingly, the flexible substrate 15 of the flexible display device according to another embodiment of the present invention is not rolled in any direction owing to the encapsulation layer 80 provided in the first area and the deformation-preventing portion 100 provided in the second area, so that it is possible to prevent the flexible substrate 15 from being entirely wrinkled.

Figure 5:
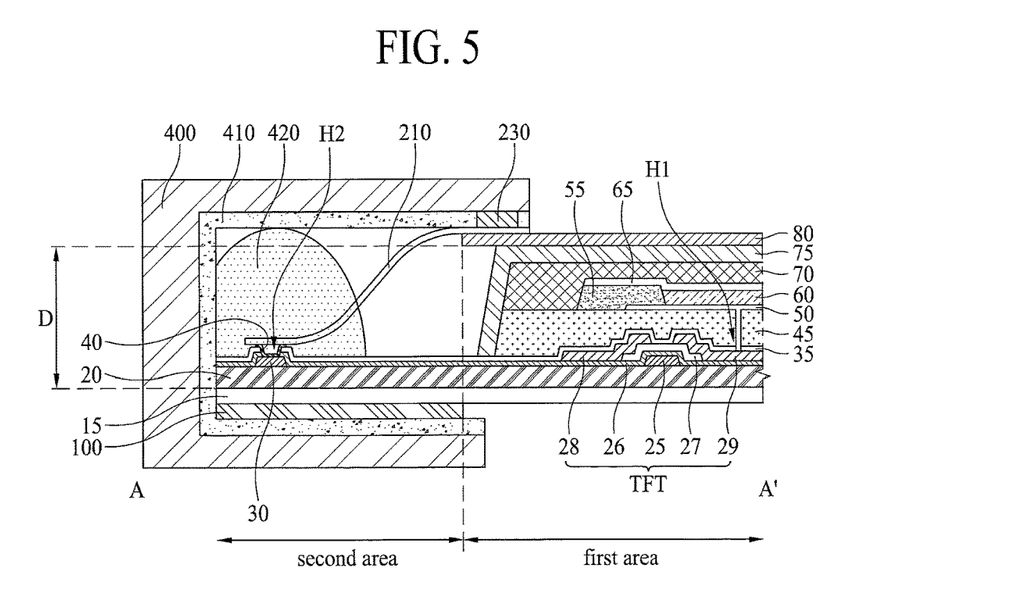
FIG. 5 is a cross sectional view illustrating a flexible display device according to another embodiment of the present invention.

FIG. 5 is a cross sectional view illustrating a flexible display device according to another embodiment of the present invention.

Except for additionally-provided film package 210, printed circuit board 230, engaging portion 400, adhesive 410 and moisture-proof agent 420, the flexible display device of FIG. 5 is identical to the aforementioned flexible display device of FIG. 4, whereby the same reference numbers will be used throughout the drawings to refer to the same or like parts, and a detailed description for the same parts will be omitted.

In order to explain the embodiment of FIG. 5, the flexible display device of FIG. 4 will be referred to as a flexible module.

One side of the film package 210 is attached to the pad electrode 40, and the other side of the film package 210 is attached to the encapsulation layer 80.

The printed circuit board 230 is provided at the other side of the film package 210. The film package 210 is formed in a shape capable of connecting the printed circuit board 230 and the pad electrode 40 with each other.

The engaging portion 400 is provided to surround the flexible module, and the adhesive 410 spreads onto an entire inner surface of the engaging portion 400. Accordingly, the engaging portion 400 and the flexible module are attached and connected to each other by the use of adhesive 410. An upper side of the engaging portion 400 is attached to the printed circuit board 230, the film package 210 and the encapsulation layer 80, wherein the upper side of the engaging portion 400 may be attached to one or more elements of the aforementioned printed circuit board 230, the film package 210 and the encapsulation layer 80. A lower side of the engaging portion 400 is attached to the deformation-preventing portion 100. That is, the engaging portion 400 is attached to an end of the encapsulation layer 80 and the deformation-preventing portion 100, and is also provided to cover one side of the flexible substrate 15.

The moisture-proof agent 420 is formed of a polymer material with good moisture-transmission resistance, thereby preventing the display module from being peeled off or broken by an external impact, and preventing permeation of moisture into the inside of the display module. The moisture-proof agent 420 is fixed to the inside of the engaging portion 400 by the use of adhesive 410.

According to the engaging portion 400 being applied to the flexible display device of FIG. 4, the flexible display device according to another embodiment of the present invention may be used as a rollable display device.

FIGS. 6A to 6H are cross sectional views illustrating a method for manufacturing the flexible display device according to another embodiment of the present invention, which relates to a method for manufacturing the flexible display device of FIG. 5. Thus, the same reference numbers will be used throughout the drawings to refer to the same or like parts, and a detailed description for the same parts will be omitted.

Hereinafter, a method for manufacturing the flexible display device according to another embodiment of the present invention will be described as follows.

Figure 6A:
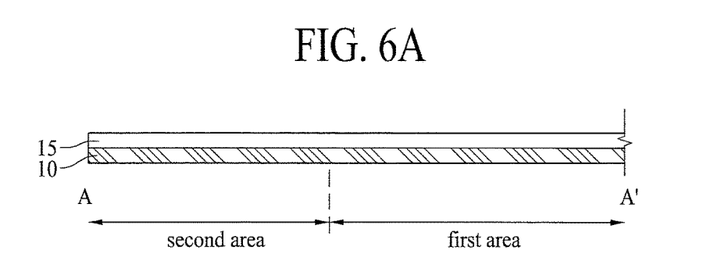
FIGS. 6A to 6H are cross sectional views illustrating a method for manufacturing the flexible display device according to another embodiment of the present invention.

First, as shown in FIG. 6A, the flexible substrate 15 is formed on the base substrate 10.

Figure 6B:
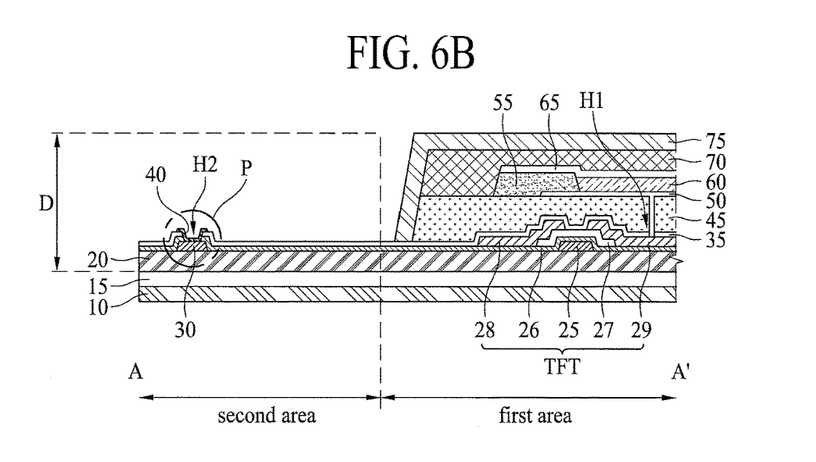

Then, as shown in FIG. 6B, the buffer layer 20 is formed on the flexible substrate 15, the thin film transistor TFT is formed on the first area of the buffer layer 20, and the pad portion P is formed on the second area of the buffer layer 20. On the thin film transistor TFT, there are the passivation layer 35, the first planarization layer 45, the first electrode 50, the bank layer 55, the organic light emitting layer 60, the second electrode 65, the second planarization layer 70, and the adhesive layer 75.

A process of forming the thin film transistor TFT include forming the gate insulating layer 26 on the buffer layer 20, the active layer 27 on the gate insulating layer 26, and the source and drain electrodes 28 and 29 on the active layer 27.

The process of forming the thin film transistor TFT may be carried out by various methods generally known to those in the art.

After forming the passivation layer 35 on the thin film transistor TFT, the first contact hole H1 for exposing the drain electrode 29 of the thin film transistor TFT is formed in the passivation layer 35 and the first planarization layer 45, and the first electrode 50 is formed to be connected with the drain electrode 29 via the first contact hole H1. Then, the bank layer 55 is formed at the side of the first electrode 50, and the organic light emitting layer 60 and the second electrode 65 are formed on the first electrode 50. The second planarization layer 70 is formed on the first planarization layer 45 and the second electrode 65, and the adhesive layer 75 is formed on the second planarization layer 70.

For the process of forming the gate electrode 25 of the thin film transistor TFT in the first area, the pad 30 is formed in the second area. For the process of forming the gate insulating layer 26 and the passivation layer 35 in the first area, the gate insulating layer 26 and the passivation layer 35 extend to the second area. The second contact hole H2 for exposing the pad 30 is formed, and the pad electrode 40 is formed on the pad 30.

Figure 6C:
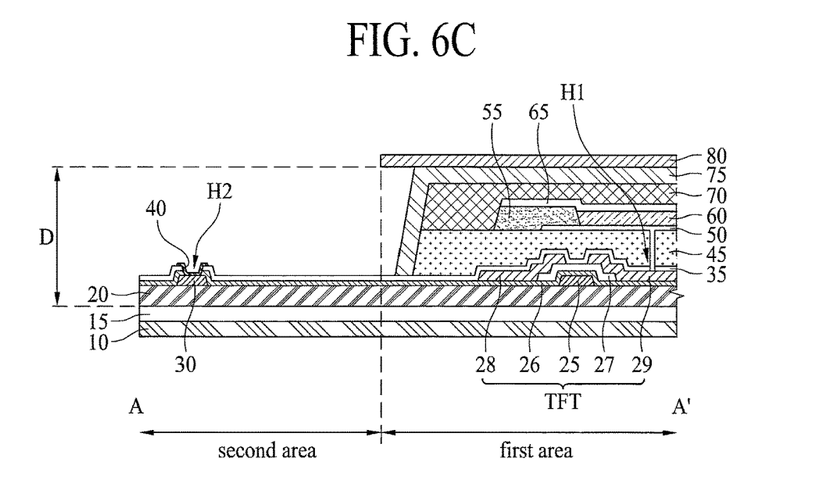

As shown in FIG. 6C, the encapsulation layer 80 is formed on the adhesive layer 75.

Then, the base substrate 10 may be removed by two methods.

Figure 6D:
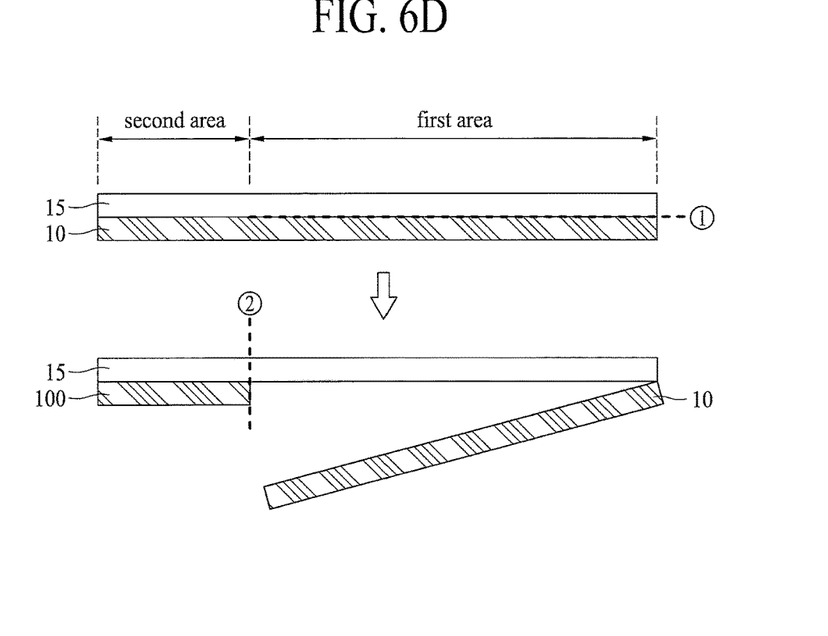

According to the first method, as shown in FIG. 6D, a release process is carried out by irradiating the first area of the base substrate 10 with a laser from a lower side. After separating the base substrate 10 from the first area of the flexible substrate 15, a scribing process is carried out to cut a line of the base substrate 10 corresponding to the boundary between the first area and the second area, to thereby separate the base substrate 10 and the flexible substrate 15 from each other.

Figure 6E:
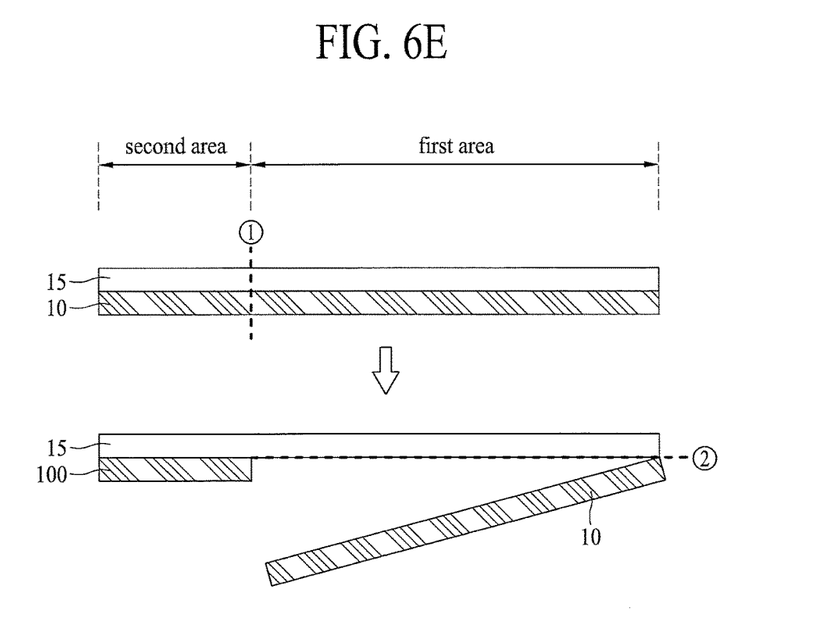

According to the second method, as shown in FIG. 6E, a scribing process is carried out to cut a line of the base substrate 10 corresponding to the boundary between the first area and the second area. After separating the base substrate 10, a release process is carried out by irradiating the first area of the base substrate 10 with a laser, whereby the base substrate 10 is separated from the first area of the flexible substrate 15.

Figure 6F:
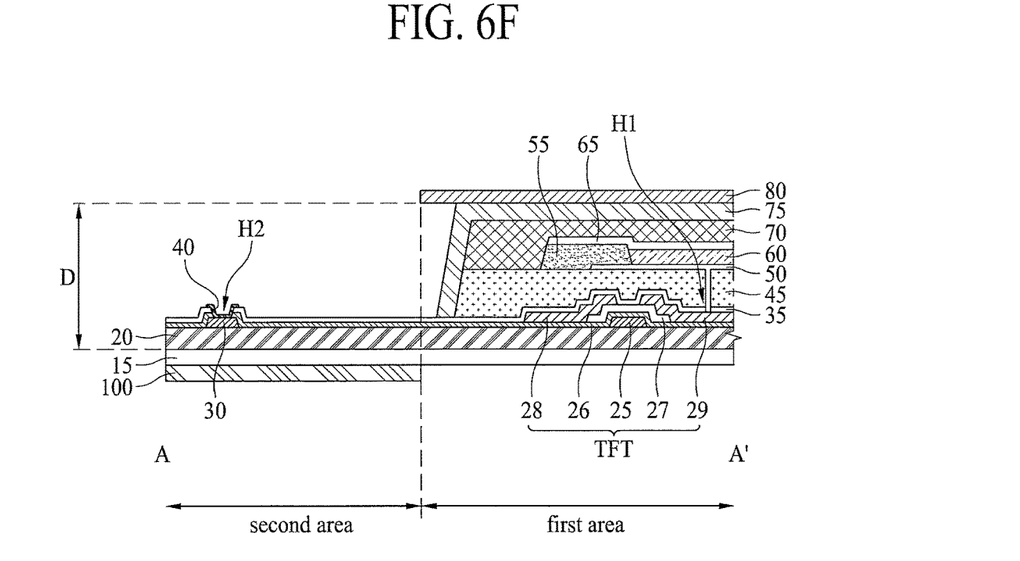

If the base substrate 10 and the flexible substrate 15 are separated from each other, as shown in FIG. 6F, only the deformation-preventing portion 100 remains on the lower surface of the flexible substrate 15.

Figure 6G:
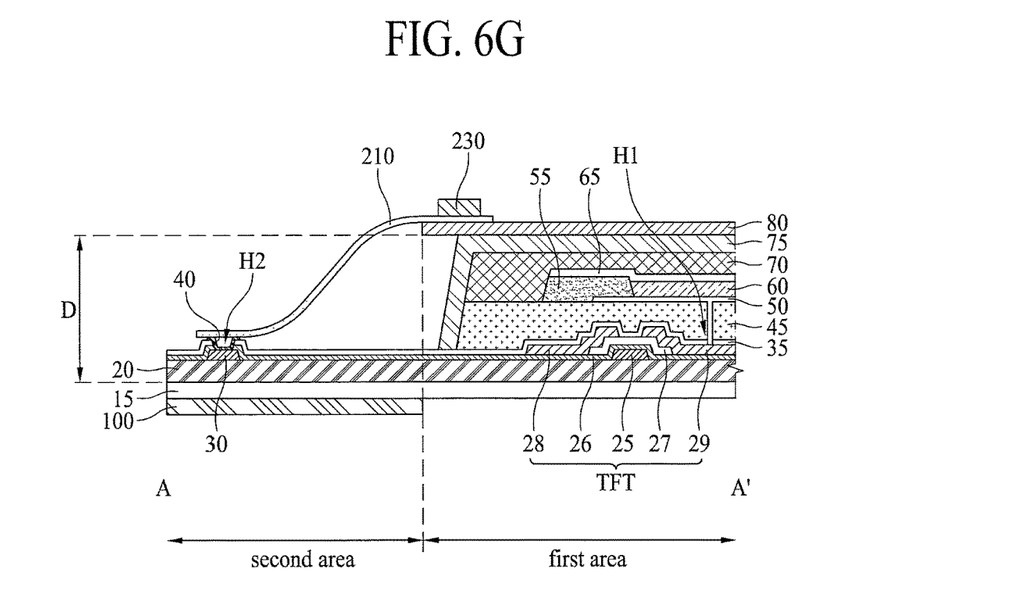

Then, as shown in FIG. 6G, one side of the film package 210 is connected with the pad electrode 40, and the other side of the film package 210 is connected with the printed circuit board 230. Then, the other side of the film package 210, to which the printed circuit board 230 is connected, is attached to the encapsulation layer 80. Especially, the other side of the film package 210 is attached to the upper surface of the encapsulation layer 80 which is close to the pad electrode 40.

Figure 6H:
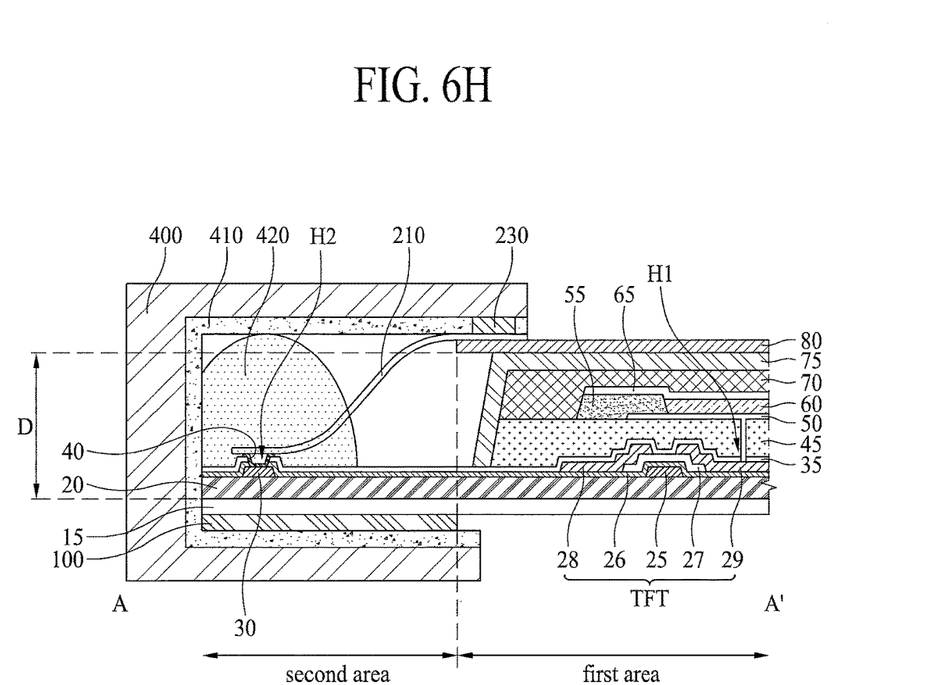

As shown in FIG. 6H, after the adhesive 410 spreads onto the inner side of the engaging portion 400, the moisture-proof agent 420 is fixed to the inner side of the engaging portion 400. Also, the upper side of the engaging portion 400 is fixed to the printed circuit board 230, and the lower side of the engaging portion 400 is fixedly attached to the deformation-preventing portion 100.

Figure 7:
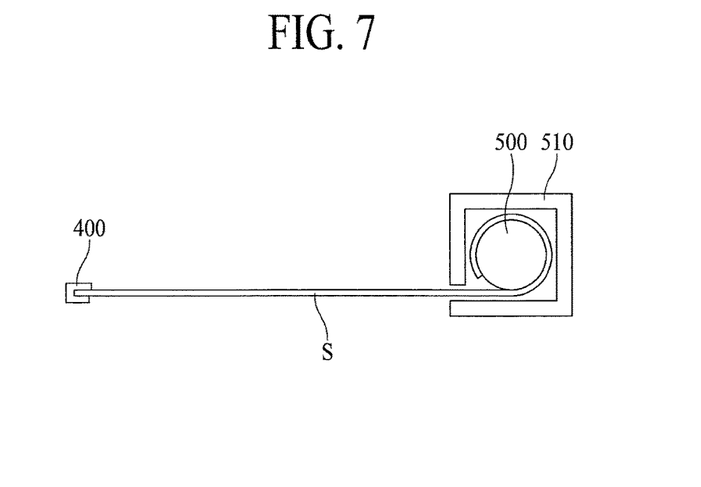
FIG. 7 is a cross sectional view illustrating a flexible display device according to another embodiment of the present invention.

FIG. 7 is a cross sectional view illustrating a flexible display device according to another embodiment of the present invention.

Except for an additionally-provided roller 500 and housing 510, the flexible display device of FIG. 7 is the same as the flexible display device of FIG. 5. Thus, the same reference numbers will be used throughout the drawings to refer to the same or like parts, and a detailed description for the same parts will be omitted.

In the flexible display device according to another embodiment of the present invention, one side of the substrate S is connected with the engaging portion 400, and the other side of the substrate S is connected with the roller 500 while being provided in a shape to be rolled on the roller 500. The housing 510 is provided to surround the roller 500 with a predetermined space for the substrate S to be rolled.

Meanwhile, the flexible display device of FIG. 7 includes the roller 500 provided at the other side of the substrate S which is not connected with the engaging portion 400, but such not necessarily required. The engaging portion 400 may be attached to the roller 500 while being provided in a shape to be rolled with the substrate S.

According to the present invention, it is possible to prevent the flexible display device from being deformed when the base substrate is removed therefrom. Also, it is possible to improve the yield by preventing the defective flexible display device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A flexible display device comprising:
   a flexible substrate;
   a display device layer provided on a first surface of the flexible substrate, the display device layer having a width and a length, and including an adhesive layer that extends along a lateral surface of the display device layer;
   an encapsulation layer attached to the display device layer by the adhesive layer; and
   a deformation-preventing portion provided on a second surface of the flexible substrate, the second surface corresponding to the opposite surface to the first surface provided with the display device layer,
   wherein the display device layer includes a first area to display an image and a second area not to display an image, the adhesive layer is included in the first area, and the deformation-preventing portion is overlapped with the second area,
   wherein the second surface of the flexible substrate corresponding to the first area is exposed, and
   wherein the first area of the display device layer includes a buffer layer, a gate insulating layer on the buffer layer, a passivation layer on the gate insulating layer, a first planarization layer on the passivation layer, and a second planarization layer between the first planarization layer and the adhesive layer, and the second area of the display device layer includes the buffer layer, the gate insulating layer, and the passivation layer.

2. The flexible display device according to claim 1, wherein the first area has a thermal deformation that is less than a thermal deformation of the second area, and
   wherein the first area corresponds to an area provided with a layer comprising an organic material which shrinks by heat and a layer comprising an inorganic material which is released by heat, and the second area corresponds to an area provided with a layer comprising the inorganic material which is released by heat.

3. The flexible display device according to claim 2, wherein the adhesive layer is not provided on the second area, but on the first area.

4. The flexible display device according to claim 1, wherein the deformation-preventing portion comprises a structure in parallel to a side of the flexible substrate.

5. The flexible display device according to claim 1, wherein a first surface of the deformation-preventing portion is exposed in the second area.

6. The flexible display device according to claim 1, wherein the first area corresponds to a display area, and the second area corresponds to a non-display area provided in a periphery of the display area.

7. The flexible display device according to claim 6, wherein the second area corresponds to an area overlapped with a pad portion provided in the non-display area.

8. The flexible display device according to claim 1, wherein the deformation-preventing portion is glass.

9. The flexible display device according to claim 1, further comprising:
   an engaging portion attached to an end of the encapsulation layer and the deformation-preventing portion and also provided to cover one side of the flexible substrate.

10. The flexible display device according to claim 1, further comprising a roller provided at one side of the flexible substrate, wherein the flexible substrate is rolled on the roller.

11. A method of manufacturing a flexible display device, the method comprising:
forming a flexible substrate on a base substrate;
forming a display device layer including a first area to display an image and a second area not to display an image on a first surface of the flexible substrate, the display device layer having a width and a length, and including an adhesive layer that is included in the first area and extends along a lateral surface of the display device layer;
forming an encapsulation layer attached to the display device layer by the adhesive layer; and
forming a deformation-preventing portion on a second surface of the flexible substrate,
wherein the deformation-preventing portion is overlapped with the second area,
wherein the second surface of the flexible substrate corresponding to the first area is exposed, and
wherein the first area of the display device layer includes a buffer layer, a gate insulating layer on the buffer layer, a passivation layer on the gate insulating layer, a first planarization layer on the passivation layer, and a second planarization layer between the first planarization layer and the adhesive layer, and the second area of the display device layer includes the buffer layer, the gate insulating layer, and the passivation layer.

12. The method according to claim 11, wherein the first area has a thermal deformation that is less than a thermal deformation of a second area, and
wherein the first area corresponds to an area provided with a layer comprising an organic material which shrinks by heat and a layer comprising an inorganic material which is released by heat, and the second area corresponds to an area provided with a layer comprising the inorganic material which is released by heat.

13. The method according to claim 11, wherein the forming the deformation-preventing portion includes:
separating an area of the base substrate corresponding to the first area from the flexible substrate by irradiating the base substrate with a laser; and
subsequently cutting a line of the base substrate corresponding to a boundary between the first area and the second area.

14. The method according to claim 11, wherein the forming the deformation-preventing portion includes:
cutting a line of the base substrate corresponding to a boundary between the first area and the second area; and
subsequently separating an area of the base substrate corresponding to the first area from the flexible substrate by irradiating the base substrate with a laser.

15. A flexible display device comprising:
a flexible substrate having a first surface and a second surface;
a display device layer provided on the first surface of the flexible substrate, the display device layer having a width and a length, and including an adhesive layer that extends along a lateral surface of the display device layer;
an encapsulation layer attached to the display device layer by the adhesive layer; and
a deformation-preventing portion provided on a portion of the second surface of the flexible substrate,
wherein the deformation-preventing portion braces the portion of the second surface of the flexible substrate from being deformed,
wherein the second surface of the flexible substrate corresponding to the display device layer is exposed,
wherein the display device layer includes a first area to display an image and a second area not to display an image, and the adhesive layer is included in the first area, and
wherein the first area of the display device layer includes a buffer layer, a gate insulating layer on the buffer layer, a passivation layer on the gate insulating layer, a first planarization layer on the passivation layer, and a second planarization layer between the first planarization layer and the adhesive layer, and the second area of the display device layer includes the buffer layer, the gate insulating layer, and the passivation layer.

16. The flexible display device according to claim 15, wherein the portion of the second surface of the flexible substrate that is braced by the deformation-preventing portion is in the second area.

17. The flexible display device according to claim 16, wherein the first area has a thermal deformation that is less than a thermal deformation of the second area, and
wherein the first area corresponds to an area provided with a layer comprising an organic material which shrinks by heat and a layer comprising an inorganic material which is released by heat, and the second area corresponds to an area provided with a layer comprising the inorganic material which is released by heat.

18. The flexible display device according to claim 16, wherein a first surface of the deformation-preventing portion is exposed in the second area.

19. The flexible display device according to claim 16, wherein the first area corresponds to a display area, and the second area corresponds to a non-display area provided in a periphery of the display area.

20. The flexible display device according to claim 19, wherein the second area corresponds to an area overlapped with a pad portion provided in the non-display area.

* * * * *